April 28, 1959 L. J. MOELLER 2,884,165
APPARATUS FOR DISPENSING A METERED AMOUNT OF A FLUID MATERIAL
Filed May 21, 1957 3 Sheets-Sheet 1
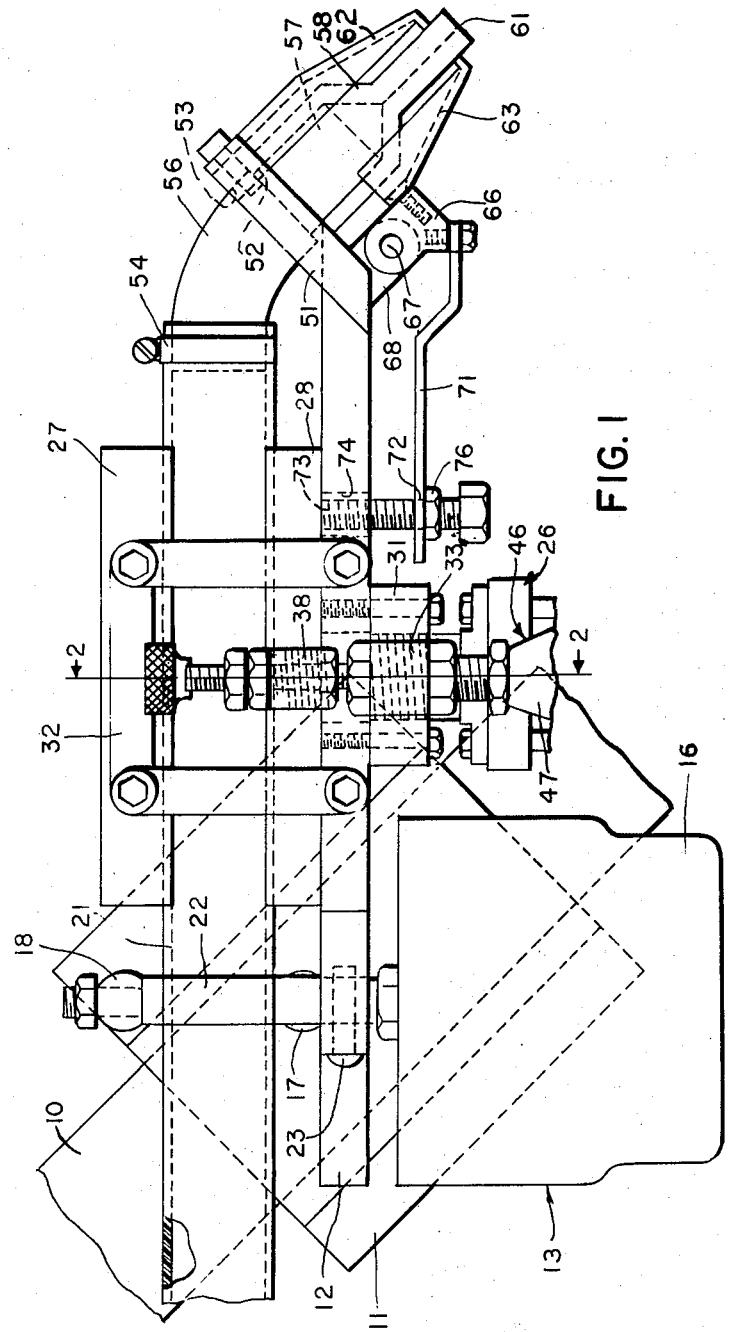
INVENTOR.
L. J. MOELLER
BY A.C. Schwarz, Jr.
ATTORNEY

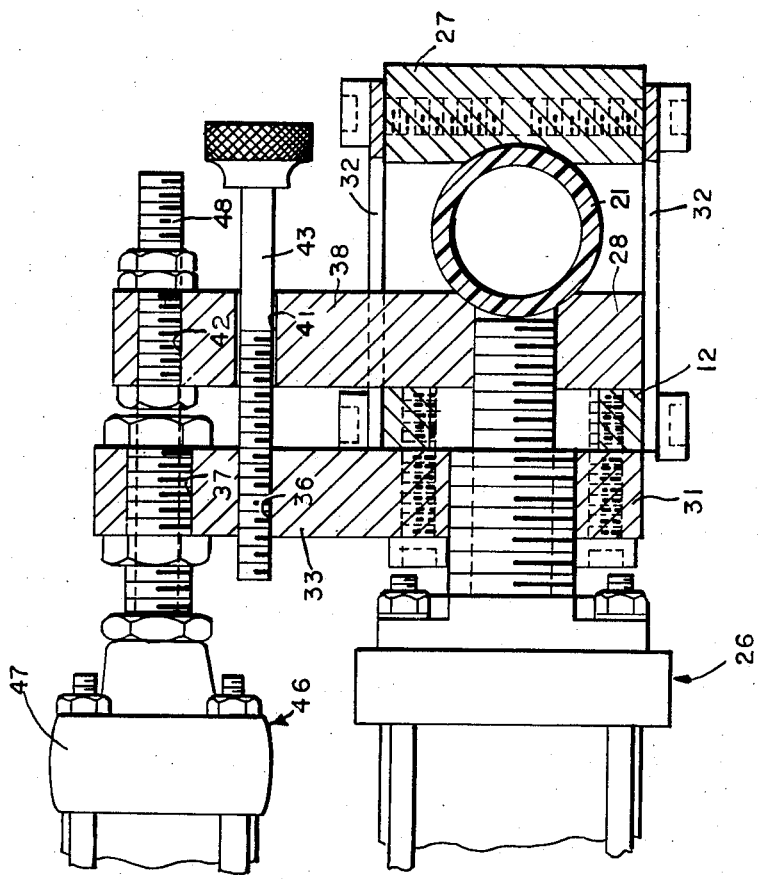

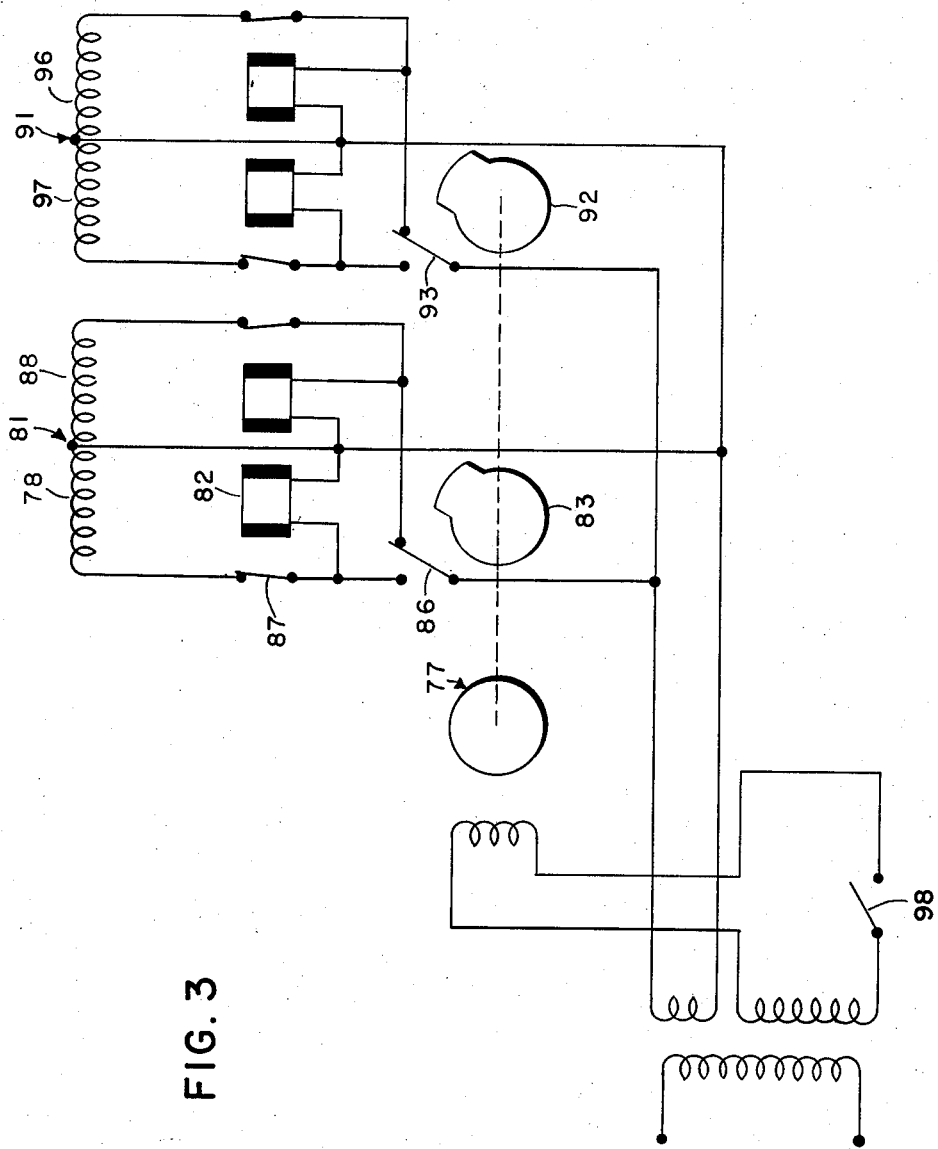

United States Patent Office 2,884,165
Patented Apr. 28, 1959

2,884,165

APPARATUS FOR DISPENSING A METERED AMOUNT OF A FLUID MATERIAL

Lowell J. Moeller, Baltimore, Md., assignor to Western Electric Company, Incorporated, New York, N.Y., a corporation of New York Application May 21, 1957, Serial No. 660,668

3 Claims. (Cl. 222—212)

This invention relates to apparatus for metering material, and may relate more particularly to apparatus for dispensing a metered amount of a viscous fluid.

In the manufacture of cast resin terminal strips for use in communications equipment, a metered amount of viscous liquid material is oftentimes deposited in a mold for producing the cast resin terminal strips. The viscous material used for such a purpose often comprises a compounded catalyzed polyester resin containing silica, fiber glass, cobalt and catalysts (peroxides), which material may be harmful to the delicate parts of conventional metering apparatus. In the past, viscous liquid metering apparatus has not been available which is accurate and which does not need frequent replacement of expensive parts as a result of the corrosive and abrasive action of certain viscous liquids.

It is an object of the present invention to provide improved apparatus for metering material.

It is a further object to provide improved apparatus for dispensing a metered amount of a viscous fluid material.

An apparatus for dispensing a metered amount of fluid material, embodying certain features of the invention, may include a tubular conduit having a discharge end, means for closing off the discharge end of the tubular conduit, means for filling the tubular conduit with fluid material, and means for closing off the tubular conduit at a distance from the discharge end. Means are provided for compressing a predetermined amount, the portion of the tubular conduit extending between the two closing-off means and for simultaneously operating the discharge-end-closing-off means to allow flow from the discharge end of the tubular conduit. Dash pot means are provided, associated with the compressing means, for controlling the rate of operation of the compressing means.

A complete understanding of the invention may be obtained from the following detailed description, when considered in conjunction with the accompanying drawings, in which:

Fig. 1 is a fragmentary side elevation, oriented at 45° in a counterclockwise direction from horizontal and vertical co-ordinates, of an apparatus forming an embodiment of the invention; Fig. 2 is an enlarged fragmentary section taken along the line 2—2 of Fig. 1, and Fig. 3 is a schematic electrical diagram of a control circuit for operating the apparatus of Fig. 1.

Referring now in detail to the drawings, a mounting member 11 is adjustably mounted upon a vertical post 10 and has secured thereto a base member 12 to which is secured rigidly an electrically controlled, air-actuated valve, indicated generally by the numeral 13, such as an RKL Series R Valve, manufactured by the RKL Valve and Manufacturing Company, Philadelphia, Pa. The valve 13 comprises an electrically controlled, air cylinder system 16, which operates to force a round pinch bar 17 towards another round pinch bar 18 for cutting off flow in a flexible tube 21.

The pinch bar 18 is secured rigidly to the air cylinder system 16 by means of a pair of guide bars 22—22, which extend through the base member 12, pass on either side of the flexible tube 21, and serve to guide the movements of the pinch bar 17 towards and away from the pinch bar 18. The complete valve 13 is secured rigidly to the base member 12 by means of a pair of rivets 23—23, each of which extends through a respective guide bar 22 and a portion of the base member 12.

The base member 12 has mounted upon it a second electrically controlled, air cylinder system, indicated generally by the numeral 26, which operates to compress the flexible tube 21 between a stationary platen 27 and a movable platen 28. The air cylinder system 26, which may be, for example, a BEXM 1-20 air motor and Electroaire Valve for electrical control thereof, manufactured by The Bellows Company, Akron, Ohio, is secured rigidly by a threaded connection to a mounting member 31, which is secured rigidly to the base member 12 by screws, or the like. The stationary platen 27 is rigidly secured to the base member 12 by means of a pair of U-shaped guides 32—32, which also act to guide the movement of the movable platen 28.

The mounting member 31 has a projection 33 extending therefrom, said projection having threaded apertures 36 and 37 therethrough. The movable platen has a projection 38 having corresponding apertures 41 and 42 therein, the axes of which are aligned with the axes of apertures 36 and 37, respectively. A limit screw 43 is received through the aperture 41 and threaded into the aperture 36 and functions to limit the movement of the movable platen 28 so as to regulate the amount of compression of the flexible tube 21 and thus regulate, along with other means, the amount of fluid material dispensed.

A hydraulic dash pot type of device, indicated generally by the numeral 46, such as, for example, a Bellows Hydro-check resistance unit, manufactured by The Bellows Company, Akron, Ohio, serves to smooth out and produce a slower speed of the compressive movement of the movable platen 28 than would be the case were the air cylinder system 26 used alone. A main body 47 of the hydraulic device 46 is secured threadedly to the mounting member 31 through the aperture 37, and has extending therefrom a movable shaft 48, which is secured to the movable platen 28 through the aperture 42. The hydraulic device 46 causes appreciable resistance to the movement of the platen 28 only on the compression stroke thereof and not on the return stroke. Preferably, the resistance to movement of the platen 28 produced by the hydraulic device 46 is adjustable so that the time required for compression of the flexible tube 21 may be set to any desired value.

Secured to the end of the base member 12 is a support member 51 having a bore 52 and counterbore 53 therethrough for receiving a metal elbow pipe 56 therein, which is secured by means of a suitable clamp 54 to the flexible tube 21 near one extremity thereof. The elbow pipe 56 has a hollow cylindrical projection 57 which is of lesser diameter than the elbow portion of the pipe and which is received within and extends through the bore 52 of the support member 51, the larger portion of the pipe 56 being received within the counterbore 53 in the support member 51.

A rubber nozzle 58 is received around the cylindrical projection 57 and may be clamped thereto, if necessary, to secure a leakproof connection, by a suitable clamp (not shown). The nozzle 58 has a closable slit 61 therein, which is normally closed, but which may be opened by fluid pressure within the nozzle 58, assuming that a stationary clamping member 62 and a movable clamping member 63 are not clamping the nozzle 58 to hold the slit 61 in a closed position.

The stationary clamping member 62 is secured rigidly to the support member 51 by means of screws, or the like. The movable clamping member 63 is secured rigidly by means of screws, or the like, to a pivotable member 66, which is pivotable about a pin 67 received within a pin holding member 68 secured rigidly to the base member 12 by any suitable means.

The pivotable member 66 has one end of an arm 71 secured rigidly thereto by means of screws, or the like, the arm 71 having a threaded aperture 72 in the other end thereof for receiving a set screw 73. The set screw 73, which extends through an aperture 74 in the base member 12, is adjusted by rotation thereof and by rotation of a nut 76 received thereon to abut the movable platen 28 when the movable platen 28 is in an uncompressed position and when the movable clamping member 63 is maintaining the slit 61 in a closed position. Thus, when the movable platen 28 is moved to compress the flexible tube 21, the slit 61 is free to be opened by the pressure within the nozzle 58 because the movable clamping member 63 is not then maintained against the nozzle 58, but rather is free to be pivoted, the set screw 73 then being free to move within the aperture 74 in the base 12.

Referring to Fig. 3, a suitable electrical timing device, indicated generally by the numeral 77, such as, for example, an RC2E12 timer, manufactured by the Industrial Timer Corporation, Newark, New Jersey, is provided to cause actuation of a solenoid 78 of an air valve, indicated generally by the numeral 81, such as a BXV 5B air valve manufactured by The Bellows Company, Akron, Ohio, controlling the admission of air to the air cylinder system 16 to cause opening of the air actuated valve 13 for a predetermined period of time. Energization of the solenoid 78 operates to retract the movable pinch bar 17 (Fig. 1) so as to permit the fluid to flow into the flexible tube 21. A relay 82 is provided to cause an electrical impulse to be delivered to the solenoid 78 when a cam 83 of the timer 77 actuates a switch 86 leftwardly, as viewed in Fig. 3. Even though the switch 86 is maintained in its leftward position during the predetermined period of time, only one impulse is delivered to the solenoid 78 because a normally closed contact 87 of the relay 82 is opened by the energization of the relay 82, thus cutting off the electrical circuit through the solenoid 78 of the air valve 81. The provision of such an impulse is necessary when actuating a "Bellows" type of air valve and if some other type of air valve is used, it may not be necessary to provide such an impulse.

When the predetermined period of time ends, the cam 83 will allow return of the switch 86 to the rightward position, as viewed in Fig. 3, which allows an impulse to be delivered to a solenoid 88 of the air valve 81 in the same manner as above-described, throwing the valve 81 in the opposite direction so as to bleed air from the air cylinder system 16 and allow spring actuated opening of the valve 13 for the balance of the cycle to move the pinch bar 17 toward the stationary pinch bar 18 so as to close off the flexible tube 21 at that point.

The electrical timing device 77 by means of a cam 92 then allows an impulse to be delivered in the manner above-described to a solenoid 96 of an air valve, indicated generally by the numeral 91, which is a portion of the air cylinder system 26, causing actuation of the air valve 91 actuating the air cylinder system 26 to cause compression of the flexible tube 21 between the platens 27 and 28 for a second predetermined period of time.

At the end of the second predetermined period of time, the cam 92 causes a switch 93 to move to its leftward position, as viewed in Fig. 3, causing an impulse to be delivered to a solenoid 97 of the valve 91, causing the valve 91 to admit air to the opposite end of the cylinder of the air cylinder system 26 to cause retraction of the movable platen 28.

Suitable camming surfaces may be provided for the cams 83 and 92 to determine the suitable duration of the two predetermined periods of time. As above-described, the actuation of the air cylinder system 26 does not cause an immediate complete compression stroke of the movable platen 28 because of the action of the hydraulic device 46, assuming that device is so adjusted as to provide resistance to the movement of the platen 28. However, when the electrical timer 77 causes retraction of the platen 28, the action of air cylinder system 26 is completed immediately no matter what the initial position of the platen 28. A foot switch 98 is provided to actuate the timer 77.

The flexible tube 21 may be composed of polytetrafluoroethylene, for example, that material known as "Teflon" and manufactured by the Du Pont Company. A flexible tube composed of such material will maintain its original shape and inside volume even though deformed a great number of times. The flexible tube 21 is connected to a predetermined constant pressure source of the fluid material to be metered. Even though changing the value of the source pressure does not greatly change the amount of material dispensed, greater accuracy is achieved by maintaining the source pressure constant. It should be noted that the flexible members 21 and 58 and the elbow pipe 56 can be easily and inexpensively replaced should the corrosive and abrasive ingredients of certain viscous liquids cause excessive wear on these parts.

*Operation*

Assuming that it is desired to deposit a metered amount of viscous liquid material in a mold, or the like, the device is adjusted so that when the movable platen 28 is in a noncompressing position and when the set screw 73 is abutting the movable platen 28, the slit 61 in the nozzle 58 is held closed by the movable clamping member 63. Depending upon the viscosity of the liquid material to be deposited, it may be desirable to adjust the hydraulic device 46 to extend the time consumed by the compression stroke of the movable platen 28 to five or ten seconds so that the material has sufficient time to flow into the various portions and crevices of the mold without spilling over the sides of the mold.

Assuming that the predetermined constant pressure source of fluid material is connected to the free end of the flexible tube 21 and that the pinch bars 17 and 18 are normally in a flow-cutting-off position, the timing device 77 is actuated by the closure of the foot switch 98, or the like, to start its cycle. The air cylinder system 16 is actuated to retract the pinch bar 17 for a predetermined period of time so as to cause an amount of the fluid material to flow into the portion of the flexible tube 21 between the elbow pipe 56 and the pinch bars 17 and 18, into the elbow pipe 56 and into the rubber nozzle 58, which have been at least partially emptied by the previous metering operation. At the end of the predetermined period of time, the air cylinder system 16 is again actuated to force the pinch bar 17 towards the pinch bar 18 for cutting off flow in the flexible tube 21 between the pinch bars 17 and 18.

After the air actuated valve 13 has cut off flow between the pinch bars 17 and 18, the air cylinder system 26 is actuated by the timer 77 to force against the platen 28 for a predetermined period of time and thus to cause, in combination with the hydraulic device 46, gradual compression of the flexible tube 21. During the time that the platen 28 is moved away from the base member 12, the arm 71, the pivotable member 66 and the movable clamping member 63 are free to pivot and allow the slit 61 to open under the pressure exerted by the fluid material, whereby a metered amount of fluid material is dispensed from the nozzle 58. At the end of the predetermined period of time, the air cylinder system 26 is actuated to retract the movable platen 28, causing clamping of the slit 61 and the metering device is ready for another cycle.

It should be noted that when the platen 28 is retracted, the flexible tube 21 begins to resume its cylindrical shape prior to the complete clamping of the slit 61, whereby the resulting low pressure within the flexible tube draws the last clinging drops of fluid material back into the tube 21. This dripless feature is most important when filling small volume molds.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for dispensing a metered amount of fluid material, which comprises a tubular conduit having a discharge end, means for closing off said discharge end of said tubular conduit, means for filling said tubular conduit with fluid material, means for closing off said tubular conduit at a distance from said discharge end, means for compressing a predetermined amount the portion of said tubular conduit extending between said two closing-off means and for simultaneously operating said discharge-end-closing-off means to allow flow from said discharge end of said tubular conduit, and dash pot means associated with said compressing means for controlling the rate of operation of said compressing means.

2. Apparatus for dispensing a metered amount of fluid material, which comprises a tubular conduit having a flexible portion, said tubular conduit having an entry end and a discharge end, a valve located at said discharge end for closing off flow out of said conduit, means for admitting fluid material to said entry end of said tubular conduit at a predetermined constant pressure, a clamp located between said entry end and said flexible portion for closing off flow in said conduit, means for opening and closing said clamp, a pair of platens located one on either side of said conduit at said flexible portion, means for forcing said platens relatively together through a predetermined distance for compressing said flexible portion, hydraulic dash pot means associated with said platen-forcing means for controlling the rate of operation of said forcing means, and a mechanical linkage between said valve and one of said platens for allowing said valve to open when said flexible portion is compressed.

3. Apparatus for dispensing a metered amount of fluid material, which comprises a tubular conduit having a flexible portion, said tubular conduit having an entry end and a discharge end, a valve at said discharge end for closing off flow in said conduit, means for admitting fluid material to said entry end of said tubular conduit at a predetermined constant pressure, a clamp located between said entry end and said flexible portion for closing off flow in said conduit, an air-actuated means for opening and closing said clamp, a movable platen, a stationary platen, said platens located on either side of said conduit at said flexible portion, air-actuated means for forcing said movable platen toward said stationary platen a predetermined distance for compressing said flexible portion, an adjustable hydraulic dash pot means associated with said platen-forcing means for controlling the rate of operation of said forcing means, a mechanical linkage between said valve and said movable platen for allowing said valve to open when said flexible portion is compressed, and means for controlling said clamp-opening-and-closing means to open said clamp for a predetermined period of time and for then controlling said forcing means to cause compression of said flexible portion for a predetermined period of time.

References Cited in the file of this patent
UNITED STATES PATENTS

| | | |
|---|---|---|
| 2,393,838 | Tarbox | Jan. 29, 1946 |
| 2,412,397 | Harper | Dec. 10, 1946 |
| 2,689,530 | Harvey | Sept. 21, 1954 |
| 2,817,461 | Gilberty | Dec. 24, 1957 |